May 28, 1929.  D. FORTIN  1,715,192

HOOK LOCK

Filed Sept. 7, 1928

Dan Fortin, INVENTOR

BY Victor J. Evans, ATTORNEY

WITNESS:

Patented May 28, 1929.

1,715,192

UNITED STATES PATENT OFFICE.

DAN FORTIN, OF SEATTLE, WASHINGTON.

HOOK LOCK.

Application filed September 7, 1928. Serial No. 304,549.

This invention relates to locking devices adapted for use upon hooks and other grapples.

An object of the invention comprehends a mounting for the lock, whereby the latter may be swung toward and away from the hook entrance.

Another object of the invention contemplates a locking element carried by the device adapted for selective engagement with the attaching portion of the hook.

A further object of the invention consists in the provision of a key member for the locking device.

With the above and other objects in view, the invention further consists of the following novel features and details of construction, to be hereinafter more fully described, illustrated in the accompanying drawing and pointed out in the appended claims.

In the drawing:—

Figure 1:
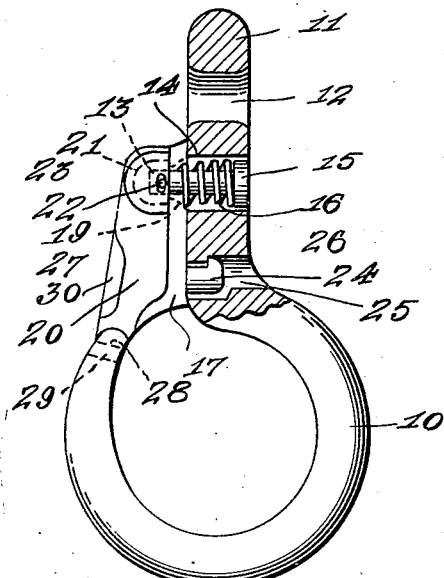
Figure 1 is a side elevation of a hook partly in section illustrating the mounting and connection of the invention therewith.
Figure 2:
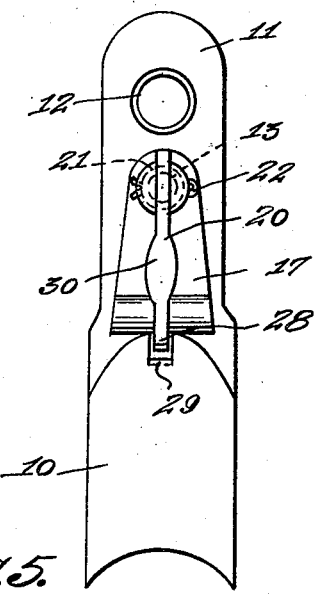
Figure 2 is a front elevation of the invention as applied upon the hook.
Figure 3:
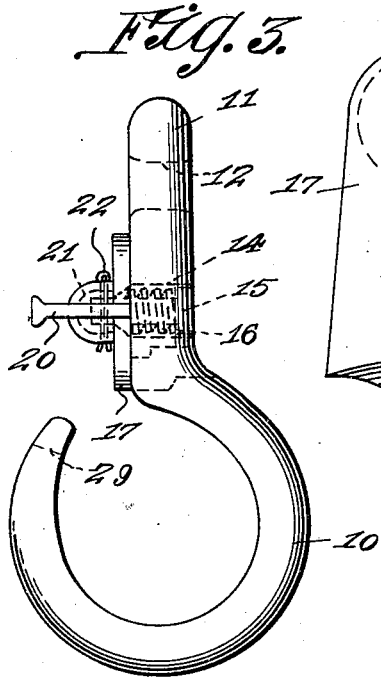
Figure 3 is a side elevation of the hook with the locking mechanism disposed in an open position.
Figure 5:
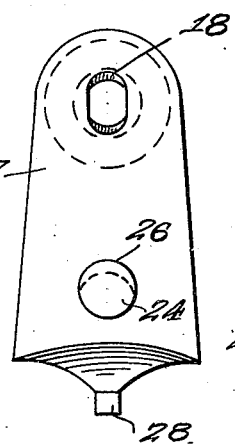
Figure 5 is a rear elevation of the invention per se.
Figure 4:
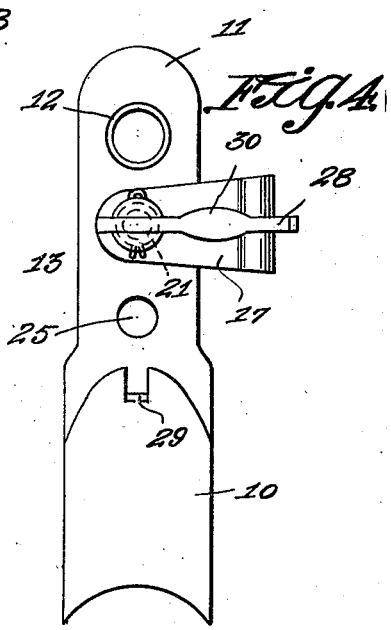
Figure 4 is an elevation of the hook and locking mechanism taken at right-angles to the illustration in Figure 3 of the drawing.

Referring to the drawing in detail, wherein like characters of reference denote corresponding parts, the reference character 10 indicates a conventional form of hook having an attaching shank 11 provided with an opening 12 adapted to accommodate the end of a cable, not shown.

The invention consists in the provision of a plunger pin 13 adapted for reception within a horizontal bore 14 in the shank 11 of the hook 10 in conjunction with the head 15 therefor. A compression spring 16, encircling that portion of the plunger pin 13 within the bore 14, is adapted to engage the innermost side of the head 15.

A plate member 17, having an eccentrically located oval-shaped socket 18 therein adapted to accommodate the outermost end of the plunger pin 13, is provided with an enlarged countersunk entrance 19, the purpose of which will be presently apparent. A key 20, carried upon the outer side of the plate 18, is provided with an enlargement 21 within which the outermost end of the plunger pin 13 is projected. A cotter key or other retaining element, such as indicated at 22, is passed horizontally through the outermost end of the plunger pin 13 and registering elongated slotted portions 23 in the enlargements 21.

A locking pin 24, carried upon the inner surface of the plate member 17, is adapted for reception within a slot or portion removed, as indicated at 25, in the shank 11. As noted, the slot or portion removed 25, is extended entirely through said shank, the purpose of which will be presently apparent.

A projection 26, carried upon the end of the locking pin 24 is yieldingly retained in contacting engagement with a shoulder portion 27 within the slot 25 by the compression spring 16.

An extension 28, depending from the lower and outermost portion of the key 20, is adapted for reception within a cut-out portion 29 in the free end of the hook to close the eye thereof.

When it is desired to open the eye to insert the yoke end of a cable member, not shown, the key 20 is grasped within the finger engaging portion 30 and shifted in a direction to dispose the extension 28 within the bottom of the cut-out portion 29. This movement is permitted by the loose connection between the key at its connection of the pin 13 through the intrumentality of the slot and pin connection.

The projection 26 upon the locking pin 24 will thus be released from the shoulder 27 within the slot 25.

The key 20 is then lifted upwardly against the tension of the compression spring 16 to free the extension 28 thereof from the cut-out portion 29 in the end hook.

The invention was primarily designed for application upon chocker hooks, generally employed in logging camps, but it is obviously understood that I do not limit myself to the embodiment of the invention shown, inasmuch as it is apparent from the disclosure of the invention that the same could be employed equally and effectually as well upon other forms of work.

The invention is susceptible of various changes in its form, proportions and minor details of construction, and the right is herein reserved to make such changes as properly fall within the scope of the appended claims.

Having thus described the invention, what is claimed is:—

1. A lock for use upon hooks comprising a plate member located adjacent the attaching shank therefor, a plunger pin included upon the shank and having connection with the plate, a spring element mounted upon the pin adapted to resiliently retain the plate upon the shank, a locking pin carried by the plate adapted for engagement with the shank, and a key included upon the outer portion of the plate being adapted to move the latter and the locking pin therefor toward and away from the entrance of the hook.

2. A lock for use upon hooks comprising a plate member located adjacent the attaching shank therefor, a plunger pin included upon the shank and having connection with the plate, a plunger pin included upon the shank and having swivel connection with the plate, a spring element mounted upon the pin adapted to resiliently retain the plate against the shank, a locking pin carried by the plate adapted for engagement with the shank, and a key included upon the outer portion of the plate being adapted to shift the latter and the locking pin toward and away from the entrance of the hook.

3. A lock for use upon hooks comprising a plate member located adjacent the attaching shank therefor, a plunger pin mounted for reciprocating action within a horizontal bore in said shank, the end of the plate adjacent one end of the horizontal bore in the shank having a socket for swivel connection with the projecting end of the pin, a spring element encircling the pin and engageable with the adjacent portion of the plate to normally retain the latter flush against the adjacent side of the shank, a locking pin carried by the plate, the shank having a slot including a shoulder engageable with the locking pin, the extremity of the hook having a cut-out portion, an extension projecting from the free end of the plate adapted for reception within the cut-out portion in the extremity of the hook, and a key carried by the plate permitting disengagement of the plate when same is shifted downwardly, outwardly and laterally independently of the shank.

In testimony whereof I affix my signature.

DAN FORTIN.